Patented Nov. 18, 1924.

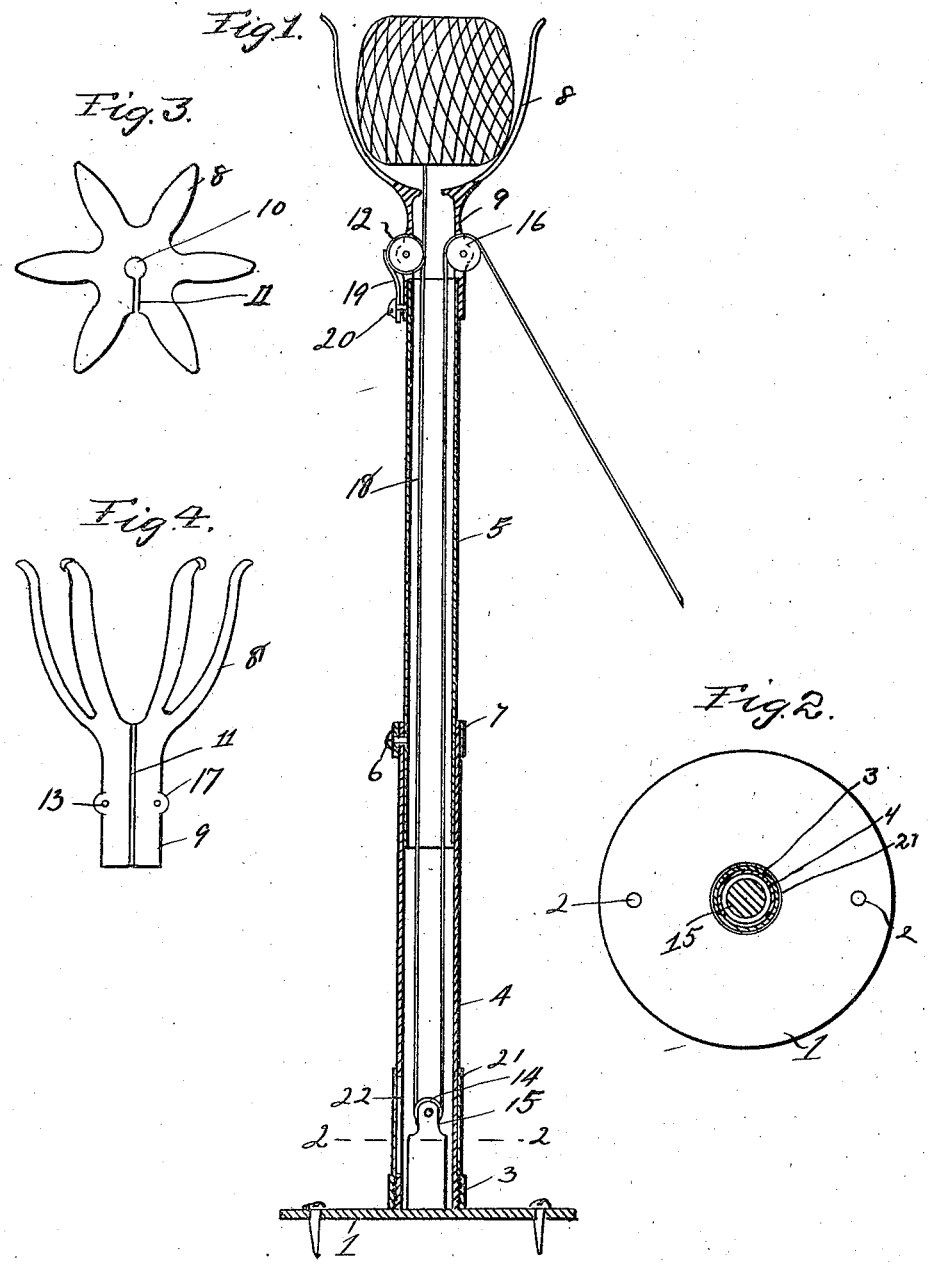

1,516,075

UNITED STATES PATENT OFFICE.

HARRY J. BOWER, OF CAMDEN, NEW JERSEY.

TWINE HOLDER AND TAKE-UP.

Application filed September 13, 1923. Serial No. 662,369.

*To all whom it may concern:*

Be it known that I, HARRY J. BOWER, a citizen of the United States, residing at Camden, in the county of Camden and State of New Jersey, have invented new and useful Improvements in a Twine Holder and Take-Up, of which the following is a specification.

My invention relates to a new and useful improvement in twine holder and take-up and has for its object to provide an exceedingly simple and effective device for holding a ball of twine and provide for the twine to be drawn from said ball in such manner as to give a slight tension to hold back on the twine and to take up the slack when the upper end of the twine is released.

A further object of my invention is to provide for the adjustment of the supporting standard so that the holder may be raised or lowered to said varying conditions.

A still further object of my invention is to provide for gaining ready access of the interior standard so as to facilitate the threading of the twine through the take-up weight.

With these ends in view, my present invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1 is a central vertical section twine holder made in accordance with my improvement.

Fig. 2 is a section at the line 2—2 of Fig. 1 looking downward.

Fig. 3 is a plan view of the cup for holding the ball of twine.

Fig. 4 is a side elevation of Fig. 3.

In carrying out my invention as here embodied 1, represents the base which may have the screw holes 2 formed therethrough for convenience in securing the device to a counter or some part of a paper holder. This base is formed with a hub 3 which is internally threaded for the reception of the threaded end of the lower section 4 of the supporting standard. The upper section 5 of this standard is adapted to slide or telescope within the lower section 4 and is held in any desired adjustment relative to the lower section by the set screw 6, said set screw being threaded through the ferrule 7 and the wall of the standard; the ferrule being in the form of a collar of considerable thickness relative to the thickness of the wall of section 4 so as to strengthen the upper edge of said section and provide sufficient thickness of metal for the threads of the screw.

8 represents a cup or holder for the reception of a ball of twine said cup being preferably constructed of a series of fingers projecting upward from the shank 9, the lower end of said shank being adapted to fit tightly over the upper end of the section 5. This cup has a hole 10 formed through the bottom thereof through which the twine leading from the ball passes and in order that the twine may be readily threaded into said hole a slot 11 forms a narrow passageway to the hole.

12 represents a tension roll journalled between the lugs 13 formed upon the shank 9 and it is intended that the twine leading downward through the hole 10 shall be passed around said tension roll at least once and then downward through the center of the supporting standard; around the pulley 14 journalled in the weight 15 and then upward; and over the guide roll 16, which latter is journalled in the lugs 17 also formed upon the shank 9.

In order that the turning of the tension roll 12 may require more or less pull upon the twine 18 I provide a friction spring 19 which is adjustably secured to the shank 9 by the tension screw 20 so that by the proper manipulation of this tension screw more or less friction will be put upon the tension roll.

In order that ready access may be had to the weight 15 for removing the same from the standard should the twine become broken, a slide tube 21 is fitted around the lower section of the standard so as to readily slide thereon, its object being to close the opening 22 in the wall of said standard or to open the same by lifting this slide tube.

From the foregoing description the operation of my improvement will be obviously as follows:—

The ball of twine being placed within the cup and the twine lead down through the hole 10, around the tension roll, the pulley 14 and the guide roll 16, any drawing upon the free end of the twine will raise the weight 15 until the guide pulley 14 comes into alignment with the tension roll 12 and the guide roll 16 after which any further pull upon the twine will draw the same from the ball permitting the tying up of bundles and the like without the danger of entanglement of the twine; but as soon as the free end of the twine is released the weight will fall to the bottom of the standard and in doing so take up the slack or surplus twine that has been left, over as will be readily understood. While my invention is especially adapted for securement upon the top of a paper holder and to be used in connection therewith or upon a counter in close proximity to such a paper holder it is obvious that the base may be made of sufficient size and weight, supporting the device without the use of screws, thus facilitating the placing of the device in any convenient place temporarily or permanently.

The adjustment of the upper section of the supporting standard provides for increasing or decreasing the amount of slack which the device will take up, since the greater the distance the weight has to travel in its upward movement the greater amount of slack it will take up in its downward movement.

Of course I do not wish to be limited to the exact details of construction herein shown, as these may be varied within the limits of the appended claims without departing from the spirit of my invention.

Having thus fully described my invention what I claim as new and useful is:—

1. In a twine holder a base; a telescoping standard secured to said base; means for holding the section of the standard in various adjustments; a cup for placing a ball of twine; shank carried by said cup, said shank being adapted to fit over the upper end of said standard; a tension roll journalled in the shank; a weight adapted to slide up and down in the standard, said weight having a pulley journaled therein; a guide roll also journalled in the standard, whereby twine leading down from the ball held in the cup may be passed around the tension roll, pulley and guide roll.

2. In a twine holder of the character described a suitable base; a standard consisting of two telescoping sections, one of said sections being secured to said base; means for holding the sections of the standard in various adjustments; a cup for holding a ball of twine; and means for putting a running tension upon the twine.

3. The herein described combination to a cup for holding a ball of twine having a hole through the bottom thereof and a slot leading to said hole; a shank carried to said cup; a tension roll journalled in the shank; means for varying the tension of said roll; a guide roll also journalled in said shank; and a two section supporting standard the sections of which telescope together the upper section adapted to receive the shank; a set screw for holding the sections in any adjustment; and means for gaining access to the interior of the lower section of the standard.

In testimony whereof, I have hereunto affixed my signature.

HARRY J. BOWER.